United States Patent [19]
Lempicki

[11] Patent Number: 5,413,740
[45] Date of Patent: May 9, 1995

[54] MATERIALS FOR EYE PROTECTION

[75] Inventor: Alexander Lempicki, Boston, Mass.

[73] Assignee: Trustee of Boston University, Boston, Mass.

[21] Appl. No.: 754,555

[22] Filed: Sep. 4, 1991

[51] Int. Cl.$^6$ .............................................. G02B 5/23
[52] U.S. Cl. ................................... 252/586; 252/589
[58] Field of Search ................ 252/582, 586, 589, 583

[56] References Cited

U.S. PATENT DOCUMENTS

| | | | |
|---|---|---|---|
| 3,635,544 | 1/1972 | Stamm et al. | 252/586 |
| 3,716,489 | 2/1973 | DeLapp | 252/586 |
| 3,725,292 | 4/1973 | Gerhardt | 252/586 |
| 5,017,698 | 5/1991 | Machida et al. | 544/71 |

OTHER PUBLICATIONS

Alger, Mark S. M., *Polymer Science Dictionary*, p. 339, Elsevier (1989).
Bell, S. et al., *Trans Faraday Soc.*, "Absorption Spectra of Silyl Compounds in the Vacuum Ultra-Violet," 62:3005–3010 (1966).
Brown, John F. et al., *J. Am. Chem. Soc.*, "Inteamolecular Interactions between Nonbonded Chromophores. The Spectra of Some Phenylsilanes and Siloxanes," 86:1406–1409 (1964).
Burgoyne, Edward E., et al., "2-Methyl Trifluoroacetate," *J. Am. Chem. Soc.*, 72:3276–3277 (1950).
C. Eaborn, "Organosilicon Compounds. Part VI. The Kinetics of the Acid-catalysed Cleavage of p-Methoxyphenyltrimethylsilane," *J. Chem. Soc.*, Part VI:31-48–3153 (1953).
C. Eaborn, *Organosilicon Compounds*, 466–473 (Butterworths Scientific Publications, London 1960).
Nagy, J., et al., "Investigations on the Bond Structure of Alkylphenoxy-Silanes Using Ultraviolet Spectrophotometric Methods," *J. Organometal. Chem.*, 9:57–65 (1967).
Yitzhak Apeloig, "Theoretical Aspects of Organosilicon Compounds" 57–69 in *The Chemistry of Organic Silicon Compounds*, (Ed. Patai, S., et al. John Wiley & Sons 1989).
Brian G. Ramsey, "Electronic Transitions in Organometalloids," 123–134, in *Organometallic Chemistry*, (Ed. Maitilis, P. M., et al. Academic Press (1969).
William R. McBride, "Optical Materials for Transmission Filters in the Middle Ultraviolet," *J. Opt. Soc. Am.*, 53:519 (TD14) (1963).
Williams R. McBride, "Composite Narrow-band Filters for the Near and Middle Ultraviolet," *J. Opt. Soc. Am.*, 53:1352 (FC11) (1963).
Smith, A. Lee, et al., "Spectroscopic Techniques for Indentification of Organosilicon Compounds", Analytical Chem. 31(7):1174–1179 (1959).
D. R. Anderson, "Infrared, Raman and Ultraviolet Spectroscopy," 247–341 in *Analysis of Silicones*,(Ed., A. Lee Smith, John Wiley & Sons 1974) vol. 41.
Alfred Stock, *Hybrides of Boron and Silicon*, 20–41 (Cornell University Press 1933).
Yorkgitis, E. M., et al., "Siloxane-Modified Epoxy Resins," 79–82, 108–109 in *Epoxy Resins and Composites*, (Ed. K. Dusek Springer-Verlag 1986).
*Analysis of Silicones*, 328–330, 340, 341, (Ed. A. Lee Smith, Second Edition 1981) (John Wiley & Sons).
William R. Dawson et al. "An Eye Protective Panel for Flash-Blindness Protection Using Triplet State Photochromism" vol. 8, No. 5, *Applied Optics*, May 1969.

*Primary Examiner*—Philip Tucker
*Attorney, Agent, or Firm*—Lorusso & Loud

[57] ABSTRACT

A photochromic plastic has been discovered which is useful in the manufacture of protective eyeglasses. The photochromic plastic comprises a host polymer material and a dopant. The plastic exhibits photochromic properties due to excited state absorption which occurs when the material is exposed to UV light. The eyeglasses function as protection against radiation from the sun as well as from industrial and other sources. The dynamic range and response time of this novel photochromic plastic may be tailored in accordance with the particular use or application desired.

6 Claims, 1 Drawing Sheet

FIG. 1
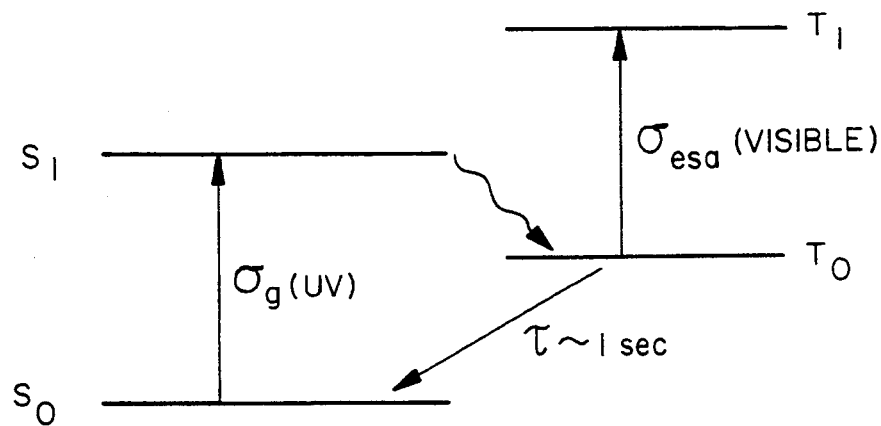
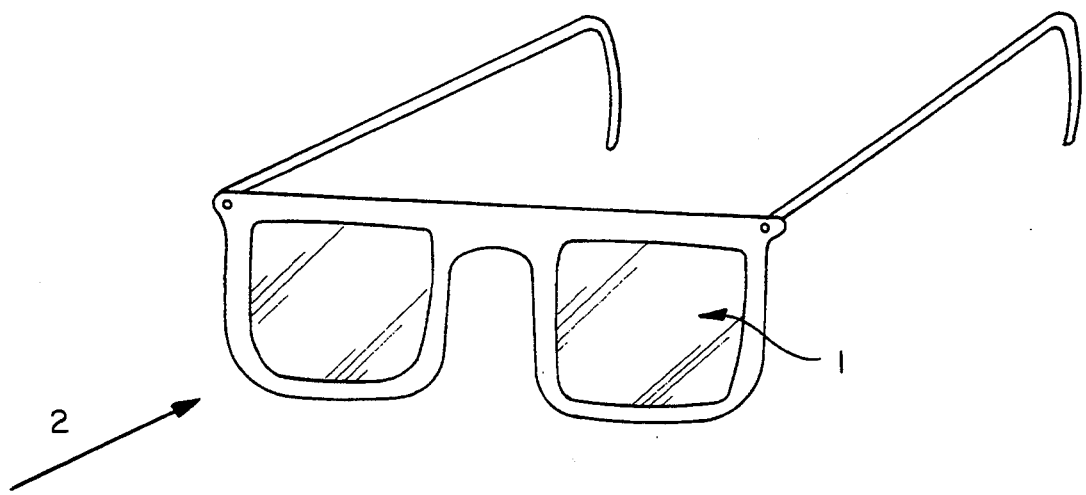
FIG. 2

MATERIALS FOR EYE PROTECTION

BACKGROUND OF INVENTION

This invention relates to a novel photochromic plastic and a method for its production. This plastic is useful for the manufacture of eye glasses functional as protection against various types of radiation such as that originating naturally from the sun or from welding arcs as occurs in industry. The phenomenon of Excited State Absorption (ESA) is exploited in the production of this novel plastic. ESA is well known in photochemistry and it occurs when the material is first excited (pumped) to its lowest excited state and subsequent radiation is then absorbed because of transitions to the next higher excited state.

PRIOR ART

Photochromic glass is known in the art and is commonly used for the manufacture of eyeglasses which protect against sunlight. Presently, researchers are looking into its use in architecture and the automobile industry.

Photochromic glass is predominantly made from silicon dioxide, i.e. sand. A relatively large amount of boric oxide is added to the glass to make it easier to work. Next, silver and copper in the form of nitrates or chlorides are added in addition to metal halide. The mixture is heated to approximately 1,200½ C. causing the ingredients to melt. The mixture is then poured into a mold and it hardens into the shape of the mold.

As the glass cools, boron changes the way it fits into the base-glass structure. Consequently, the halogens that were dissolved in the glass become less-soluble, come out of solution and react with the silver and copper. The reaction precipitates crystallites of silver halide that contain small amounts of copper halide. These crystallites are precipitated by reheating the mixture to approximately 600½ C. for 30 minutes. The crystallites are too small and too transparent to scatter or absorb visible light. Visible light occurs at the wavelength of approximately 4,000-7,000. At this point, the glass remains clear and colorless.

Crystallites are not transparent to shorter wavelengths and absorb ultraviolet (UV) light from the sun. When exposed to ultraviolet light, the silver ions, positively charged and ionically bonded to negative halogen ions, gain an electron from the copper ion to become neutral atoms. The neutral silver atoms cluster together to form tiny specks of silver metal. Many sizes and shapes of the specks are formed and thus all wavelengths are absorbed. The glass then darkens to a grey color. When illumination ceases, the copper ions regain their lost electrons. The silver metal specks reconvert to silver halide and the glass fades back to the original colorless state. Nothing is lost from the crystallites and thus the process can repeat itself without degradation.

The main disadvantage of photochromic glass for eyeware is its bulk. Thus, photochromic glass eyeglasses are normally heavy to the wearer and also thick. In addition to the bulk problem, photochromic glass is characterized by a slow response to radiation.

A 1969 publication describes a plastic photochromic panel, however, this panel has never been commercially manufactured due to its complete impracticability. The paper describing this epoxy panel is entitled "An Eye Protective Panel for Flash-Blindness Protection Using Triplet State Photochromism", Dawson et al, *Applied Optics*, Vol. 8, No. 5, p.1045 (May 1969). This panel was designed for military personnel, specifically for Air Force pilots, to use as protection against radiation originating from explosions such as that caused by nuclear weapons. This panel includes two photochromic plates of epoxy plastic containing four aromatic hydrocarbon compounds which are excited to their triplet states with two xenon flashlamps. The triplet absorption of the aromatic compounds results in a photochromic absorbance of 2.42 when the panel is activated with a 3000 J flash; 85% of the final absorbance is achieved 150$\mu$ sec after the beginning of the flash. The transmission of the panel recovers to 37% 5 sec after the panel darkens. The open-state transmission of the panel is 83%.

The main problem with this epoxy panel is that it must be pumped by artificial light to become photochromic. Of course, this characteristic makes this material totally unsuitable for eyeglass use.

The above-described photochromic epoxy panel has not been used beyond its experimental phase. It has never been available on the market and it also has not been used by the military sector. The reason for this is self-evident; this panel is extremely impracticable due to the necessity of employing xenon lamps to excite the molecules in the epoxy. Certainly, the flash of the xenon lamps is not desirable for a pilot to have to contend with while he or she is navigating the aircraft. There is also the inconvenience of having a panel in addition to the windshield of the aircraft.

Thus, to date a photochromic plastic which is practicable and which can be commercially manufactured has not been available. The present invention provides such a novel plastic which can be used for various purposes, one of them being lightweight, inexpensive protective eyeglasses.

SUMMARY OF THE INVENTION

In accordance with the present invention, a photochromic plastic has been discovered which is useful in the manufacture of protective eyeglasses. In one embodiment, the photochromic plastic consists essentially of a host polymer material and a dopant. The plastic exhibits photochromic properties due to excited state absorption which occurs when the material is exposed to UV light. These eyeglasses function as protection against radiation from the sun as well as from industrial and other sources. The dynamic range and response time of this novel photochromic plastic may be tailored in accordance with the particular use or application desired.

Accordingly, a primary object of the present invention is to provide a photochromic material that is relatively light weight when compared to glass.

Another object of the present invention is to provide a photochromic material which possesses a faster response to radiation than conventional glass photochromic material.

Yet another object of the present invention is to provide a novel plastic photochromic material suitable for eyewear.

Still another object of the present invention is to provide a photochromic plastic which darkens in response to the UV component of natural light to provide protection for the wearer in bright light situations.

Other objects and advantages of the invention will become apparent from the description of the invention which follows, made with reference to the drawings.

BRIEF DESCRIPTION OF THE DRAWINGS

FIG. 1 is an energy level diagram of a material useful in the present invention;

FIG. 2 shows sunglasses with lenses made from the photochromic plastic material of the present invention.

DESCRIPTION OF THE PREFERRED EMBODIMENTS

At the outset, the invention is described in its broadest overall aspects with a more detailed description following. In its broadest overall aspect, the invention relates to a photochromic plastic which is useful in the manufacture of protective eyeglasses. These eyeglasses, as illustrated in FIG.2, function as protection against radiation from the sun as well as from industrial and other sources. In FIG. 2, the photochromic plastic lens 1 is shown as well as the UV component in natural light 2 which causes the plastic lens to darken.

The plastic which is subject of this invention is, in its preferred embodiment, essentially transparent in the visible light spectrum. This means, that the material has its fundamental absorption bands in the near UV light. The radiation screened by the material of this invention should reach a threshold in the UV range. In eyeglass use of the novel photochromic plastic, solar radiation meets this threshold.

There are two components of this photochromic plastic; one is the host plastic polymer and the other is the dopant which gives the plastic photochromic properties. The optical processes giving rise to the photochromic effect are described below.

The dopant absorbs UV photons in its ground state "g" and is then excited to its lowest excited state "e". Longer wavelength photons, contained in the source radiation, i.e. visible photons cause the transition to the next excited state. This is what is known as Excited State Absorption (ESA) which is the phenomenon responsible for the increased opacity of the photochromic material. The ESA absorption should extend over most of the visible spectrum.

FIG. 1 illustrates the known electronic structure of organic molecules and the transition from one excited state to another is shown. The fundamental singlet-singlet absorption leads to the formation of excited triplet states. The triplet-triplet absorption is then responsible for ESA and the photochromic effect. This is described in detail below.

There are many equivalent quantities which describe the absorptive characteristics of a medium. The most common quantity is the absorption constant $\alpha(cm^{-1})$ which is related to the decadic Optical Density (OD) by the relation $$OD = \alpha \cdot 1.304$$

where 1 is the thickness of the slab of the photochromic material. Next, is the molecular quantity referred to as the absorption cross section $\sigma(cm^2)$ related to $\alpha$ by $$\alpha = \sigma \cdot N$$

where N is the number density of the absorbers (per $cm^3$). OD can then be expressed as $$OD = 0.434 \cdot \sigma \cdot N \cdot 1$$

In photochemistry, the number density is known to be often replaced by a molar concentration [M] whereby the following equation is used $$[M] = 10^3 \cdot N/A_v$$

where $A_v = 6.02 \times 10^{23} mole^{-1}$ is Avogadro's number.

Then, the (decadic) molar extinction coefficient $\epsilon$ is introduced, which, like $\sigma$, is a molecular constant. It is related to $\sigma$ by $$\epsilon = 6.02 \times 10^{23} \cdot \sigma [L\ cm^{-1} mol^{-1}]$$

and to the OD by $$OD = \epsilon [M] \cdot 1$$

The quantities $\alpha$, OD, $\sigma$, N, [M] and $\epsilon$ can be referred to as either the ground state $g$ or the excited state $e$. Thus, if it is required that upon exposure to the potentially harmful radiation, the photochromic material should acquire an optical density $OD_e$, then this results in the equation $$OD_e = 0.434 \cdot \sigma_e \cdot N_e \cdot 1$$

The primary goal here is to calculate the number density $N_e$ from the characteristics of the photochromic material as well as the incoming radiation. Thus, the UV component of the radiation provides the excitation or "pumping" rate per second W. The equation governing the formation of the excited state population is $$\dot{N}_e = W N_g - N_e/\tau$$

where $\tau$ is the decay constant of the excited triplet state. The solution for the excited state is approximately $$N_e = W N_g \tau (1 - e^{-t/\tau})$$

and for the steady state $$N_e = W N_g \tau$$

If the pumping radiation is in the form of a flash of duration $\delta t$, much shorter than $\tau$, then the following equation obtained $$N_e = W N_g \delta t$$

Thus, the time response of the system can be much faster than $\tau$ if there is enough radiation flux to reach the required $N_e$ in a shorter time.

Next, the pumping rate is calculated. This is given in terms of the extinction coefficient for the ground state of the dopant; $\epsilon_g(\lambda)$, the transmission characteristics of the host medium; $T_o(\lambda)$ which is dimensionless and the differential flux $F(\lambda)$ falling on the sample. $F(\lambda)$ is measured in units of photons/$cm^2$.sec.wavelength interval. W is thus obtained by $$W = \int \sigma_g(\lambda) T_o(\lambda) F(\lambda) d\lambda$$

Since ESA takes place only over the region of the photochromic material which is excited, it becomes evident that the absorption constants $\alpha_g$ and $\alpha_e$ or extinction coefficients $\epsilon_g$ and $\epsilon_e$ should be approximately equal. Any additional thickness of the photochromic material may be mechanically desirable but plays no optical role. This implies the following "matching" condition $$N_g \cdot <\epsilon_g> = N_e \cdot <\epsilon_e>$$

where the angular brackets indicate some reasonable averages of the extinction coefficients. If the above equation is written in this form; $N_e = N_g [<\epsilon_g>/<\epsilon_e>]$, it becomes evident that substances with $\epsilon_e$ as large as possible will be advantageous because they will reduce the required value of $N_e$.

For the purpose of illustrating the present invention, it is assumed that the excited singlet state plays no role because all of its population is instantly transferred to triplet state. A more general treatment allows for the excited singlet state to decay to the ground state by fluorescence and/or non radiative transitions with a rate constant $k_f$ and to undergo intersystem crossing to the triplet state with a rate constant $k_{st}$. The steady state solution of this problem leads to $$N_e = \left[ \frac{W}{(k_f/k_{st} + 1)k_\tau + (Wk_\tau/k_{st} + W)} \right] N_o$$

where $N_o$ denotes the total concentration and $k_\tau = 1/\tau$. The square bracket in the above equation is the fraction of the total concentration which may exist in the triplet state. If it is assumed, that the intersystem crossing rate $k_{st}$ is sufficiently larger than the other rate constants, then the above equation yields $$N_e - \frac{W N_o}{k_\tau + W}$$

if the intersystem crossing is comparable with fluorescence; $k_f - k_{st}$ but $k_{st} >> k_\tau$, then $$N_e - \frac{W N_o}{2k_\tau + W}$$

As will be shown below, both W and $k_\tau$ should be of the order of unity. The two immediately preceding equations then yield $$N_o/3 < N_e < N_o/2$$

The above expression indicates that as long as the intersystem crossing is much faster than the triplet decay and even when fluorescence occurs, near saturation is possible. This becomes apparent as the triplet state population will accumulate over its decay time $\tau$.

Next, the calculations for the approximate values of the various parameters which the host-dopant system has to fulfill for the purpose of the present invention will be established. First, it is assumed that $OD_e = 2$; i.e one percent transmission after darkening. Next, the matching equation $N_g \cdot <\epsilon_g> = N_e \cdot <\epsilon_e>$ is considered. The condition $\epsilon_g < \epsilon_e$, although advantageous, may not be easily fulfilled. This condition, however, is absolutely essential for so called "passive" materials exhibiting light limiting properties. In this case, monochromatic beams of light serve both as a pump and as the radiation which is to be limited or attenuated. These "passive" materials, however, are not of interest for purpose of the present invention. The materials of greatest interest are those with the largest $\epsilon_e$.

It is assumed that $<\epsilon_g> - <\epsilon_e>$ and that both ground and excited state absorption processes are optically allowed and therefore have characteristic cross sections of the order $\sigma_g - \sigma_e - 10^{-16} cm^2$ or the equivalent extinction coefficients of $-6 \times 10^4$. This indicates that $N_e - N_g$ or is near saturation. From the equation $OD = 0.434 \cdot \sigma \cdot N.1$ it is estimated, that for a 0.5 cm sample the excited state population has to be $N_e - 10^{17}$. To what extent this is possible will depend upon three factors: 1) the concentration of absorbing species $N_g$; 2) the decay time $\tau$; and 3) the available flux F and pumping rate W. These factors will be considered separately below.

First, if it assumed, that the number density is $N_g - 10^{17} cm^{-3}$, then the corresponding molar concentration is $[N_g] = 1.6 \times 10^{-4}$. It is required that the concentration of the excited species $[M_e]$ be of the same order of magnitude. Second, the requirement for decay time for the excited state $\tau$ is in the order of one second. This is a reasonable amount of time within which to achieve saturation with available fluxes, e.g. solar fluxes and also an often encountered triplet decay time. Third, this is the most critical requirement of the pumping rate which is given by the equation $W = \int \sigma_g(\lambda) T_o(\lambda) F(\lambda) d\lambda$. It is immediately apparent from the equation $N_e = W N_g \tau$ and the directly preceding discussion, that W must be of the order of unity.

Based on the above considerations, the following can be estimated. If the steady state solar radiation is 1 $KW/m^2$ or $10^{-1}$ watts/cm² at sea level, then the fraction of the solar black body radiation, lying in the interval of 300 to 400 nm, is approximately 6 percent. This interval provides the "pumping" radiation which in turn produces the excited states. Thus, "pumping" radiation from the sun of approximately $0.6 \times 10^{-2}$ watts/cm² is obtained which in turn translates to approximately $10^{16}$ photons per sec per cm².

The previously given equation $$W = \int \sigma_g(\lambda) T_o(\lambda) F(\lambda) d\lambda$$

can be simplified by treating $F(\lambda)$ in the interval as constant. Further, if the plastic host is perfectly transparent in the interval $T_o(\lambda) = 1$, the equation $W = \int \sigma_g(\lambda) T_o(\lambda) F(\lambda) d\lambda$ becomes $$W = 10^{16} \cdot \int \sigma_g(\lambda) d\lambda$$

where the integral is over the 300–400 nm interval. Since it has been concluded that W must be of the order of unity, this means that the average cross section in this interval must be of the order of $10^{-16}$. In addition, if the decay time $\tau - 1$, then the available solar flux should be sufficient to achieve near saturation, i.e. $N_e - N_g$. Materials which constitute the preferred embodiment of the present invention are described below.

The first material described is the plastic host. Here, the choice is limited because for the purpose of this invention the host must be transparent in the 300–400 nm region. Transparency in this instance means that at 300–400 nm more than 50% of light is transmitted through the host material. There are three materials in particular which may be used as the host in accordance with the present invention. One useful host material is the epoxy resin DER 332 manufactured by Dow Chemical Co. This material is the reaction product of epichlorohydrin and Bisphenol A. The transmission of DER 332 is not ideal because the 300–400 nm region is far from transparent. However, the advantage of this polymer is that it has been used in the past for triplet-triplet absorption spectroscopy. The results reported indicate that DER 332 behaves at room temperature as EPA glass at 77 K.; insofar as triplet lifetimes are concerned.

Another polymer useful for the purpose of this invention is Glass Resin GR-650 TM which is manufactured by OI-NEG TV Products (Toledo, Ohio). This polymer is based on silicone (a methylpolysiloxane) and has a remarkably high transparency; all the way down to approximately 200 nm. In the 300–400 nm interval $T_o(\lambda)$ can be taken as unity for this substance, however, there is no literature available on its use in triplet absorption spectroscopy.

Yet another host material is an organically modified silicate; ORMOSIL. This substance has attracted attention in the art as a host for dye laser media. This material can be used as a host in the present invention.

Turning now to the dopant required for purpose of the present invention. The following is a list, in order of decreasing importance, of properties which should be considered when choosing a dopant for the purpose of fulfilling the requirements of the present invention.

1. $\epsilon_e$ as high as possible, i.e. at least 50,000 Lmol$^{-1}$cm$^{-1}$;
2. Triplet lifetime $\tau$ in the order of a second or longer; and
3. $\epsilon_g$ in the interval of 300–400 nm should be as high as possible, i.e. at least 50,000 Lmol$^{-1}$cm$^{-1}$ both in terms of peak value and width of absorption lines. The integrated cross section in the interval is the most important factor.

Table I below, provides a list of materials useful as dopants in accordance with the present invention. These dopants are described in terms of their ESA absorption peaks $\lambda_T$ and extinction coefficients $\epsilon_e$. 4-acetylbiphenyl is a dopant useful for the purpose of this invention is described in Table I below and also in Example 1 which follows.

TABLE I

| Compound | $\lambda_T$ (nm) | $\epsilon_e$ (Lmol$^{-1}$cm$^{-1}$) |
|---|---|---|
| 4-acetylbiphenyl | 435 | 130,000 |
| Acridine Orange, conj. monoacid | 490 | 135,000 |
| Bifluorenylidene | 440 | 110,000 |
| β-apo-14′-carotenal | 490 | 112,000 |
| β-carotene | 515 | 170,000 |
| 1-chloranthracene | 437 | 61,000 |
| coproporphyrin III | 401 | 144,000 |
| α-crocetin | 470 | 94,000 |
| all-trans-3′,4′didehydro-β-, ψ-16′-carotenal | 580 | 363,000 |
| 7,7′-dihydro- β-carotene | 478 | 420,000 |

The selection criterion for the compounds listed in Table I is the magnitude of the extinction coefficient $\epsilon_e$ which was chosen to be exceedingly large. This data is for room temperature conditions. Only in the case of bifluorenylidene was the triplet lifetime given at 77° K. at about one second in organic glass. It is usually the case, that these low temperature triplet lifetimes are of the same order as the room temperature lifetimes in solid, e.g. plastic media.

In producing the novel material of this invention a general manufacturing scheme is to dope into a glass resin such as methylpolysiloxane. Suitable methylpolysiloxane resins are the GR-650 TM or the GR-654 TM glass resin manufactured by OI-NRG TV Products (Toledo, Ohio). Epichlorohydrin and bisophenol A epoxy resin is also suitable. DER-332 TM is an example of such resin manufactured by Dow Chemical Co (Midland, Mich.). The dopant includes any dopant from Table I. Usually about 10$^{-2}$ to about 10$^{-5}$ molar concentrations, and preferably 10$^{-3}$ to about 10$^{-4}$ molar concentrations are useful, but other levels of dopant are contemplated. Doping can be done from prior to polymerization beginning or shortly before complete polymerization. To obtain a more satisfactory final photochromic plastic product, care must be taken to properly cure the host polymer.

As the optical properties of the final material are frequently essential to the use to which the novel material is placed, the avoidance of air bubbles is important. Stirring and mixing in a manner that avoids air bubbles is advised, as is degasing the precursors when possible.

The present invention is further illustrated by the following nonlimiting example.

EXAMPLE 1

4-acetylbiphenyl/GR-650 TM Glass Resin Lens Blanks

GR-650 Glass Resin is purchased as a mixture of monomer with ethanol and water. The molecular weight of 4-acetylbiphenyl is 196.25 gm. To dope 100 ml (as supplied) of GR-650 monomer glass resin, 0.01 gm 4-acetylbiphenyl to the resin and thoroughly mixed without the inclusion of bubbles.

In a 250 ml beaker the mixture is heated to 140° C. in about 15 minutes. This step removes much of the solvent water and ethanol. It is well known in the art that the rate of evaporation which affects the polymerization and should be closely followed according to the manufacturers directions to yield the proper precure.

After 15 minutes the heated solution is poured into metal lense blank molds yielding discs of 10 to 25 mm in thickness. The metal molds are lined with aluminum foil for easy lens removal. To maintain proper cure the metal molds are preheated to 100° C. The filled molds are placed in a curing oven at 90° C. for 24 hours. After curing, molds are removed from the oven and cooled. The lens blanks are removed from the molds and the foil stripped away. The lens blanks are then placed on fresh foil and returned to the oven for another 6 days.

After final removal from the oven the lense blanks are ground to optical surfaces for placement in eyeglasses.

EXAMPLE 2

4-acetylbiphenyl/GR-650 TM Glass Resin Lense Blanks

As an alternative procedure, the procedure of Example 1 is followed, except that the 4-acetylbiphenyl is added to the 650 Glass Resin after the resin has been heated to 140° C. and remains above 100° C. In this procedure, the 4 acetylbiphenyl is added in the form of a solution with ethanol.

EXAMPLE 3

4-acetylbiphenyl/DER-332 TM Epoxy Resin Lens Blanks

In a 250 ml beaker 100 ml of DER-332 TM epoxy resin mixed with 15 ml of diethylenetriamine. Diethylenetriamine is an activator for polymerization of the resin. Doping of the resin is accomplished by adding 0.02 gm 4-acetylbiphenyl (dissolved in a about 3 ml solvent) to the resin and thoroughly mixing without the inclusion of bubbles.

The mixture is then placed in lens molds and heated gradually under vacuum to 100° C. and maintained there for 24 hours. After curing, molds are removed from the oven and cooled. The lens blanks are removed from the molds, and ground to the desired optical product.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

What is claimed is:

1. A photochromic material excitable by the ultraviolet components of broad band radiation comprising
   (a) a methylpolysiloxane polymer host material; and
   (b) a photochromic dopant characterized by the following properties:
      (i) an average absorption in the ultraviolet of 50,000 $Lmol^{-1}cm^{-1}$ in the 300–400 nm region; and,
      (ii) excited state absorption $\epsilon_e$ of at least 50,000 $Lmol^{-1}cm^{-1}$ at wavelengths longer than 400 nm.

2. The photochromic material of claim 1 wherein the dopant is present at between about $10^{-2}$ to about $10^{-5}$ molar concentration.

3. The photochromic material of claim 2 wherein the dopant is present at between about $10^{-3}$ to about $10^{-4}$ molar concentration.

4. The photochromic material of claim 1 wherein the dopant is 4-acetylbiphenyl, acridine Orange conj. monoacid, bifluorenylidene, $\beta$-apo-14'-carotenal, $\beta$-carotene, 1-chloranthracene, coproporphyrin III, $\alpha$-crocetin, all-trans-3',4'didehydro-$\beta$-, $\psi$-16'-carotenal, or 7,7'-dihydro-$\beta$-carotene.

5. The photochromic material of claim 4 wherein the dopant is present at between about $10^{-3}$ to about $10^{-4}$ molar concentration.

6. The photochromic material of claim 1 wherein the transmission for the dopant in the 300–400 nm region of the spectrum is greater than 75%.

* * * * *